April 7, 1964

J. C. SMELTZER 3,128,454

SIGNAL DISPLAY SYSTEMS

Filed Aug. 20, 1958

INVENTOR.
JACK C. SMELTZER
BY Samuel Lindenberg
Morris Spector
ATTORNEYS

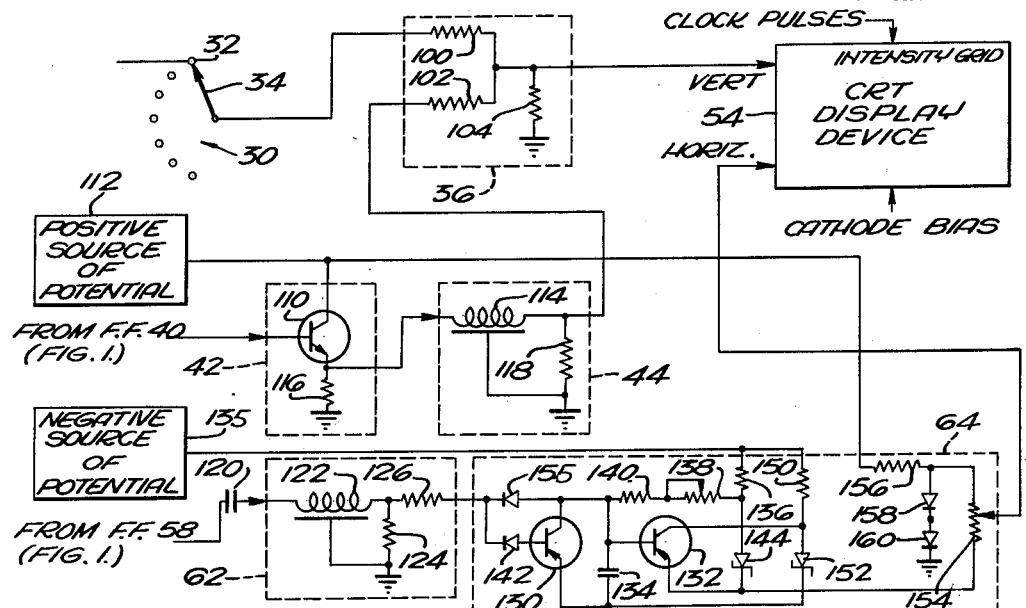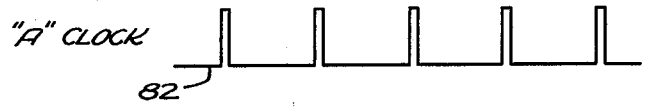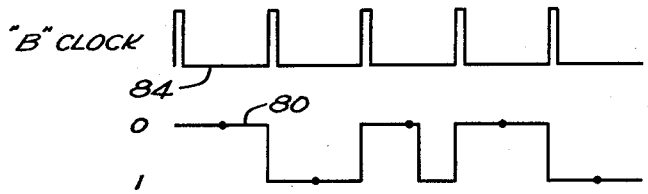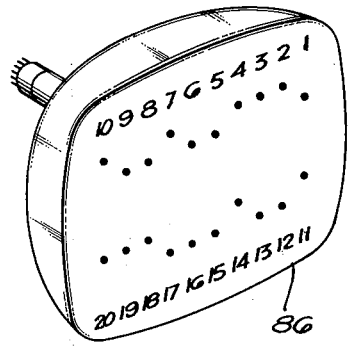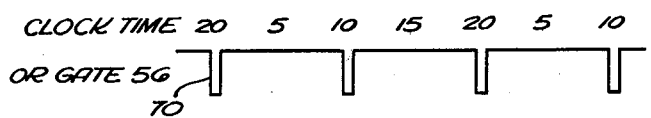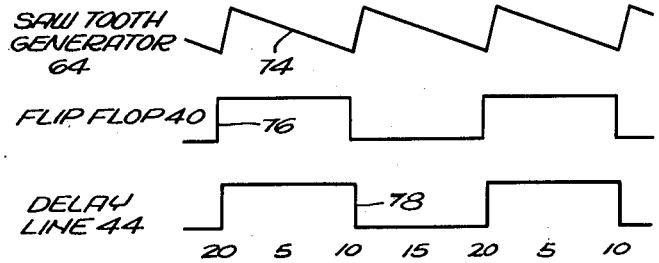

United States Patent Office 3,128,454
Patented Apr. 7, 1964

3,128,454
SIGNAL DISPLAY SYSTEMS
Jack C. Smeltzer, Torrance, Calif., assignor, by mesne assignments, to Thompson Ramo Wooldridge Inc., Cleveland, Ohio, a corporation of Ohio
Filed Aug. 20, 1958, Ser. No. 756,197
3 Claims. (Cl. 340—174.1)

This invention relates to apparatus for displaying electrical signals and, more particularly, to improvements therein.

Present-day information-handling machines using electronic techniques are extremely complex devices. Considerable assistance in the construction and maintenance of these systems is provided by cathode-ray tube apparatus, making it possible to display electrical signals taken from various points in an information-handling machine. A skilled engineer can tell by looking at these signals what type of trouble is being experienced. For example, with machines which employ digital signals for representing data, by looking at a group of such digital signals each time this group is passed or processed through a different part of the machine, and seeing what changes, if any, occur in the wave shape presentation on the face of the cathode-ray tube, troubleshooting or diagnostic maintenance is simplified.

If the digital signals being derived for presentation occur in a repetitive fashion, such presentation presents no problem. However, too often this is not the case, and transient occurrences, or occurrences of insufficient frequency for presentation on the cathode-ray tube face, require other solutions.

An object of the present invention is the provision of a novel arrangement for presenting signals for display.

Another object of the present invention is the provision of a useful and unique arrangement for presenting a display of digital signals.

Yet another object of the present invention is the provision of an inexpensive arrangement for a circulating storage and cathode-ray tube digital signal display apparatus.

These and other objects of this invention are achieved in apparatus wherein the signals desired to be displayed are recorded on a storage medium. This storage medium is movable relative to two transducers, one of which will be designated as a writing transducer and the other as a reading transducer. The reading transducer is spaced apart a desired distance from the writing transducer in the direction of motion. A signal delay circuit couples the output of the reading transducer to the writing transducer. Display apparatus receives signals for display from the signal-delay circuit. As the storage medium is moved, the signals recorded thereon are read by the reading transducer and fed back through the delay circuit to the writing transducer which rerecords them on the storage medium which passes thereunder before passing underneath the reading transducer. Thus, effectively, a circulation register is provided, and the signals which are read are applied to the signal display device, which may be a cathode-ray tube. A sweep voltage generator is provided for spreading the signals being read over the face of the cathode-ray tube.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 2 is a wave shape diagram shown to assist in an understanding of the invention;

FIGURE 3 is a circuit diagram of portions of the invention which are employed for driving the indicator;

FIGURE 4 is a wave shape diagram of a type of digital signals shown to assist in an understanding of the invention; and FIGURE 5 illustrates the visual presentation obtained in accordance with this invention.

Figure 1:
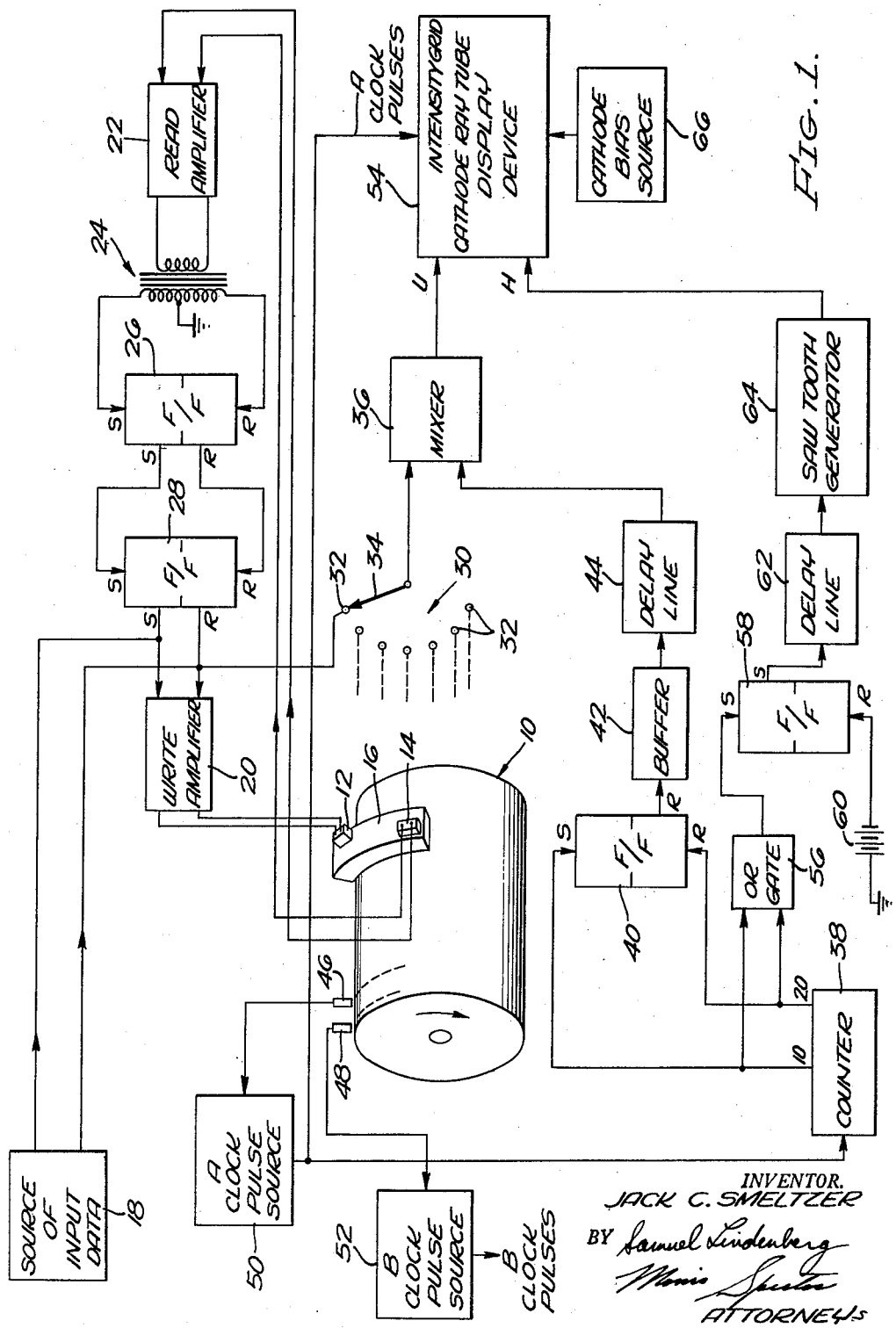
FIGURE 1 is a block diagram of an embodiment of the invention.

As previously mentioned, this invention includes a movable storage medium. By way of exemplification, in FIGURE 1 this is shown as a magnetic drum 10. This is not to be construed as a limitation upon the invention, since as this description progresses it will be seen that either magnetic tape or punched paper tape, or other storage media, may be employed as the movable storage medium. In FIGURE 1 a writing transducer 12 and a reading transducer 14 may be held in position by any suitable device, such as a holding means 16. These are positioned over the same track of a drum. Data, which it is desired to display, can be written on the track of the drum, using the writing transducer 12. The source of such data is not a portion of this invention and will here be represented as a rectangle 18, labelled as "source of input data." This may represent, for example, any portion of an information-handling machine, which can include this invention. When inspection of this data is desired, it is applied to a write amplifier 20, which drives the writing transducer 12.

The spacing between the reading and writing transducers 12, 14 should not be less than the spacing on the recording medium which is occupied by the desired number of digital signals to be read. Using, by way of illustration, a 20-binary bit word module, the spacing between the heads 12, 14 should not be less than the distance required for recording these 20 bits. This distance can be greater, if desired. It should be noted that the reading head is downstream, or away from the writing head, in the direction of rotation of the drum. The signals which are recorded in the register track are read by the reading transducer 14 and applied to a read amplifier 22 for amplification. Using a suitable coupling means, represented by the transformer 24, the output of amplifier 22 is applied to drive a flip-flop circuit 26. The output of flip-flop circuit 26, in turn, drives a second flip-flop circuit 28, the output of which is applied to the write amplifier 20 to drive the write transducer 12 and thereby record these signals on the drum track again. Flip-flop circuits are well known in the field in which this invention lies. A suitable flip-flop circuit, for example, is shown and described in an article entitled, "Transistor Circuits for Digital Computers," by Devitch, on page 8 of Electronics Engineering Manual, volume VIII, published by McGraw-Hill Book Company, Inc.

It should be appreciated that effectively a circulating register is provided wherein the information read from the moving recording medium is applied through a delay circuit which can include one or more bistable state devices, such as the flip-flop circuits, to be written again on the surface of the storage medium in advance of the reading transducer. The spacing of the writing and reading transducers should be at least the spacing of the group of digital signals desired to be displayed; otherwise, the writing head will write over and thus obliterate some of these digits. The circulation of the data is continual and may be interrupted when desired, either by writing new data or by opening at any suitable place one of the connections in the delay circuit connecting the reading with the writing transducers 14, 12.

Output from the circulating register may be obtained from any portion of the delay circuit. It is shown being taken from the output of flip-flop 28. It is applied to a selector switch 30, which includes a plurality of contacts 32 and a selector arm 34. Each one of these contacts may be connected to a different circulating register in the machine. The selector switch output is applied to one input on a mixer 36. The other input to the mixer has applied thereto a voltage having a duration equal to the occurrence of a desired number of digits in the digital group being displayed. Using the example indicated herein, a 20-bit word, or group of digits, is to be displayed. A counter 38 provides one output when 10 of these digits occur and a second output when 20 of these digits occur. The counter is a cyclic one. The 10 and 20 count outputs from the counter 38 are applied to respectively set and reset a flip-flop 40. The reset output of the flip-flop 40 is applied to a buffer circuit 42, the output of which is applied through a delay line 44 as the second input to the mixer circuit 36. The counter circuit is well known in the field in which this invention lies. A suitable circuit is illustrated in the previously indicated article "Transistor Circuits for Digital Computers."

It is customary and well-known practice in the computer or information-handling machine art to provide a source of synchronizing pulses for an entire machine. These are known as clock pulses, and the source is usually designated as a clock-pulse source. Usually, the occurrence of digital pulses is timed so that these occur in synchronism with the clock-pulse sources. Reading and writing operations and pulse-reshaping operations all occur synchronized by the clock-pulse source.

The clock-pulse source may be a very stable oscillator. In information-handling machines having magnetic storage drums, a number of tracks around the drum have pulses recorded thereon which are continuously read for the purpose of providing clock pulses. In FIGURE 1 there are shown two reading transducers, respectively 46 and 48, which are positioned over tracks of the drum which have pulses recorded thereon in the manner of clock pulses. The reading transducer 46 drives suitable amplification and pulse-shaping circuits, the outputs of which serve as A clock pulses. These circuits are designated as the A clock-pulse source 50. Similarly, the circuits driven by the reading head 48 are designated as the B clock-pulse source 52. The counter 38 is driven by A clock pulses, since one of these occurs simultaneously with each digit being read.

As described previously, it will be seen that a mixer 36 recurrently provides 20 digit pulses as an output. The first 10 of these will be applied to the vertical deflection grid of a cathode-ray tube device 54, substantially unmodified. The remaining 10 of these pulses, however, will be superimposed upon a voltage provided by the output of flip-flop 40 during the interval required for the pulses 11 through 20 to occur.

If it were desired to display the 20 digit pulses in a single line across the face of the cathode-ray tube, then it would not be necessary to insert the additional voltage employing the mixer 36. However, usually space considerations require the use of as small a cathode-ray tube as can be reasonably seen. Therefore, the arrangement just described is employed so that a two-level digit display may be provided, whereby instead of a five- or six-inch cathode-ray tube face, a three-inch cathode-ray tube face may be employed.

Since effectively two-level vertical deflection signals are provided, a horizontal deflection is provided whereby a cathode-ray beam will sweep across the face of the tube twice during the occurrence of the 20 binary digits. This is achieved by applying the output of the counter 38 to an OR gate 56 input. The OR gate circuit will be recognized as a buffer circuit which will provide an output when either of its inputs is activated. It is well known in the field in which this invention lies, and a suitable circuit is described and shown in the previously mentioned article "Transistor Circuits for Digital Computers." The OR gate 56 output is applied to a flip-flop 58 to drive it to its set condition each time the OR gate inputs are actuated. A bias source 60 serves to reset the flip-flop 58 when the OR gate output signal is removed. Accordingly, when the counter 38 counts 10, flip-flop 58 is set; upon the removal of the 10-count, flip-flop 58 is reset. Flip-flop 58 is set again during the occurrence of the 20-count output of the counter. The output of flip-flop 58 is applied to a delay line 62, the output of which is employed to drive a sawtooth generator 64.

The circuit of the sawtooth generator 64 is synchronized with each input pulse to generate a new sweep voltage in response to each input pulse. Thus, with the occurrence of the 10-count and the 20-count of the counter, the cathode-ray beam will start a new horizontal sweep. In view of the addition of the voltage of flip-flop 40 to the signals being displayed, this results in a two-level binary digit presentation, with the digits from 1 through 10 being on one line and the digits from 11 through 20 being on the line below that. To render the digital presentation more intelligible, as will be made clearer hereafter, a cathode bias source 66 is provided which biases off the cathode-ray beam except in the presence of clock pulses from the A clock-pulse source 50, which are applied to the intensity grid of the cathode-ray tube for the purpose of intensifying the beam and thus rendering it visible.

FIGURE 2 is a wave shape diagram which is shown in order to assist in an understanding of the invention. The first waveform 70 shows the train of pulses which are applied by the OR gate 56 to flip-flop 58. These occur at every tenth and twentieth clock pulse. The output of delay line 62 (which in the embodiment of the invention was a 1½ microsecond delay line) is indicated by the wave shape 72 in FIGURE 2. Each one of the pulses in the wave shape 72 is substantially identical with that of the wave shape 70, except they are slightly delayed. The output of the sawtooth generator is represented by the wave shape 74. Thus, each one of the pulses in the wave shape 72 causes the sawtooth generator to start a new sweep voltage.

The wave shape 76 in FIGURE 2 represent the output of the flip-flop 40. It will be recalled that this flip-flop is reset on the twentieth count and remains reset for the first 10 binary digits. As a result, its reset output is high. The tenth count output of the counter 38 sets flip-flop 40, which remains set during the last ten binary digits, whereby its reset output is down. The output of the delay line 44 is represented by the wave shape 78. The delay line delay interval is provided to match that of delay line 62 so that the establishment of the two signal levels are synchronized with the output of the sawtooth generator.

Referring now to FIGURE 3, there may be seen preferred circuits for the portion of the invention between flip-flop circuits 40 and 58 shown in FIGURE 1 and the cathode-ray tube display device 54. The selector switch 30 output is connected to a mixer 36. This includes three resistors 100, 102, and 104. The resistor 100 is connected to the selector switch arm 34. The resistor 102 is connected to the delay line 44, and the third resistor 104 is connected from the junction of the other two resistors to ground. The junction of the three resistors is connected to the vertical deflection input of the cathode-ray tube display device 54.

The buffer 42 includes a transistor 110, the base of which is connected to the reset output of flip-flop 40. The collector of the transistor 110 is connected to a positive source of potential 112; the emitter of the transistor 110 is connected to a load resistor 116 and to the delay line 44. The delay line 44 includes a series inductance 114 and a shunt terminating resistor 118. Inductance 114 is connected to the resistor 102.

Flip-flop 58 is connected through a coupling capacitor 120 to a delay line 62. This includes a series-connected inductance 122 and a shunt-connected resistor 124. A resistor 126 connects inductance 122 to the sawtooth generator 64. The circuit of the sawtooth generator shown herein, which is preferred, is described and claimed in an application by this inventor for a Wave Shape Generator, filed May 21, 1958, Serial No. 736,917, and assigned to this assignee. This sawtooth generator includes a first transistor 130 and a second transistor 132. The collector of the transistor 130 is connected to one side of the capacitor 134, and the emitter of the transistor 130 to the other side of the capacitor 134. Accordingly, when transistor 130 is rendered conductive, providing a low-impedance path between its emitter and collector, the capacitor 134 can discharge through the transistor. When transistor 130 is rendered nonconductive, then capacitor 134 is bridged by a high impedance and it can be charged up by a voltage derived from a negative source of potential 135. The negative-potential source 135 is coupled to capacitor 134 through a resistor 136, which is in series with a potentiometer 138, which in turn is in series with another resistor 140. Potentiometer 138 is employed in order to adjust the time for charging the capacitor 134.

Transistor 130, because of the blocking diode 142, is maintained nonconductive until such time as a negative pulse (shown by the wave shape 72 in FIGURE 2) is applied thereto. At that time, the transistor is rendered conductive and discharges capacitor 134. At the termination of the discharge, capacitor 134 will commence to charge in a negative direction, as represented by the wave shape 74 in FIGURE 2. The base of transistor 132 is connected to the junction between capacitor 134 and resistor 140 to receive the sweep voltage signal. A diode 144 is connected between the emitter of transistor 132 and the junction of the potentiometer 138 and the resistor 136. This diode is of the type known as the Zener, or voltage-regulating, diode. It is connected in reverse direction to develop its characteristic back-voltage characteristics, whereby it can regulate and supply additional charging current to that which flows through potentiometer 138 and resistor 140 to the capacitor 134 to maintain such current constant. Sweep-signal output from the emitter of transistor 132 is applied to a potentiometer 154, from which connection is made to the horizontal input of the cathode-ray tube apparatus 54. The positive source of operating potential 112 provides a bias for the emitter of transistor 132 and is connected thereto through resistor 156 and potentiometer 154. Diodes 158 and 160 are connected in series between resistor 156 and ground to assist in establishing the desired low-bias level. The source of negative potential 135 is provided for charging the capacitor 134 and is connected through a resistor 150 to the collector of transistor 132. Zener diode 152 serves to provide some feedback signal between transistor 132 and 130 for further linearization of the operation of the sweep generator. Diode 155, together with diode 142, is rendered conductive by a negative pulse received from the delay line 62 and assists in discharging capacitor 134 and preventing it from accumulating any charge during this time.

Thus far, the specific nature of the digital signals which are used with this embodiment of the invention has not been described, since the invention may be employed with all types of digital signals. However, in a system which included an embodiment of the invention, a preferred type of digital signal was employed which is shown in FIGURE 4 and represented by the waveform 80. Also shown in FIGURE 4 is the waveform for the A clock pulses 82 and the waveform for the B clock pulses 84. A two-level digital representation as represented by the waveform 80 was used. The rules for such presentation are that, whenever a B clock pulse occurs, the digital wave shape changes from one level to the next. The reading of the digital data occurs only during the A clock-pulse interval. It will therefore be seen that during the first A clock pulse the digit represented is $A_1$; during the second A clock pulse the digit represented is $A_0$; during the third A clock pulse the digit represented is $A_1$ again; during the fourth A clock pulse the digit represented is $A_1$; and during the fifth A clock pulse the digit represented is 0. Changes from 1 to 0 and vice versa can be made in the interval between the A and B clock pulses.

FIGURE 5 is a representation on the face of the cathode-ray tube 86 of the digits which are derived from the circulating register in accordance with this invention. It will be seen that there is a two-level presentation, consisting of dots where on each level the lower dot has one binary-bit value and the upper dot has a second binary-bit value. The presentation is clear and instantaneously readable. Where a two-level representation of the binary digits is employed in a computer, an identical presentation to that shown in FIGURE 5 is obtained. Where the presence or absence of a pulse respectively is employed for representing the binary bits in a computer, then a presentation such as shown in FIGURE 5 is obtained, except that where no pulse is present there will not be present a dot on the face of the cathode-ray tube. Since the required binary-bit locations may be established by a suitable screen positioned in front of the cathode-ray tube, no problem is presented in reading. With these situations, it may be preferred, however, to eliminate the dot intensification feature by removing the cathode bias source 66. Alternatively, the arrangement may be employed with another cathode-ray beam for showing on an auxiliary line when clock pulses occur.

It will be appreciated that with this invention the visual presentation is clear and unequivocal. Information-handling machines which already include either drum or tape storage by the simple expedient of providing an extra transducer along with the associated circuitry shown in FIGURE 1, can obtain a superior arrangement for the diagnostic checking of the operation of the machine. Accordingly, there has been described and shown herein a novel, useful, improved, and inexpensive system for obtaining and recurrently displaying signals.

I claim:

1. In a system of the type wherein a group of digital signals are recorded on a movable storage medium and a writing transducer is operatively juxtaposed to said storage medium, a system for displaying signals recorded on said storage medium comprising a reading transducer, means for positioning said reading transducer operatively adjacent said storage medium and spaced from said writing transducer in the direction of motion of said storage medium a distance at least equal to the distance occupied by said group of digital signals on said storage medium, a digital signal delay means for coupling said reading transducer output to said writing transducer input, said signal delay means including a flip-flop circuit, and means for driving said flip-flop circuit responsive to said reading transducer output signals, cathode-ray tube means, including cathode ray beam generating means, means for deflecting said cathode ray beam along one coordinate axis responsive to said flip-flop circuit output, means for recurrently deflecting said cathode ray beam along a second coordinate axis, means for generating a voltage during alternate intervals of deflection of said cathode ray beam along said second coordinate axis, and means for adding said voltage to the output from said flip-flop circuit for providing two display levels for signals by said cathode ray tube means, and means for applying output from said flip-flop circuit to said cathode-ray tube means to be displayed thereby.

2. A system as recited in claim 1 wherein said cathode-ray tube means includes means for biasing off said generated cathode-ray beam, and means for overcoming the bias applied by said last-named means for a desired interval during the occurrence of each digit to assist in the identification of a digit being displayed.

3. In a system of the type wherein a group of digital signals are recorded on a movable storage medium and a writing transducer is operatively juxtaposed to said storage medium, a system for displaying signals recorded on said storage medium comprising a reading transducer, means for positioning said reading transducer operatively adjacent said storage medium and spaced from said writing transducer in the direction of motion of said storage medium a distance at least equal to the distance occupied by said group of digital signals on said storage medium, means including a flip-flop circuit coupling said reading transducer output to said writing transducer input, means for establishing a voltage during the occurrence of a predetermined number of digital signals in said group, means for mixing said voltage with said digital signals, a cathode-ray tube including cathode-ray beam generating means, means for deflecting said cathode-ray beam along one of a pair of co-ordinate axes responsive to output from said means for mixing, means for recurrently deflecting said cathode-ray beam along the other of said pair of co-ordinate axes first during an interval when said voltage is not applied to said mixer and thereafter when said voltage is applied to said mixer, means for biasing off said generator cathode-ray beam, and means for overcoming the bias applied by said means for biasing for a desired interval during the occurrence of each digit to assist in the identification of a digit being displayed.

References Cited in the file of this patent

UNITED STATES PATENTS

| | | |
|---|---|---|
| 2,679,035 | Daniels et al. | May 18, 1954 |
| 2,709,770 | Hansen | May 31, 1955 |
| 2,766,400 | Clark et al. | Oct. 9, 1956 |
| 2,770,797 | Hamilton et al. | Nov. 13, 1956 |
| 2,787,416 | Hansen | Apr. 2, 1957 |
| 2,870,430 | Hancock | Jan. 20, 1959 |
| 2,950,459 | Loper et al. | Aug. 23, 1960 |